United States Patent
Saito et al.

(10) Patent No.: US 9,546,337 B2
(45) Date of Patent: Jan. 17, 2017

(54) LUBRICANT COMPOSITION

(71) Applicant: JX NIPPON OIL & ENERGY CORPORATION, Tokyo (JP)

(72) Inventors: Masanori Saito, Tokyo (JP); Ken Sawada, Tokyo (JP); Kuniko Adegawa, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/417,633

(22) PCT Filed: Aug. 23, 2013

(86) PCT No.: PCT/JP2013/072593
§ 371 (c)(1),
(2) Date: Jan. 27, 2015

(87) PCT Pub. No.: WO2014/034568
PCT Pub. Date: Mar. 6, 2014

(65) Prior Publication Data
US 2015/0252281 A1  Sep. 10, 2015

(30) Foreign Application Priority Data

Aug. 30, 2012  (JP) ................. 2012-190028

(51) Int. Cl.
C09K 5/04 (2006.01)
C10M 129/70 (2006.01)
C10M 171/00 (2006.01)
C10M 129/66 (2006.01)

(52) U.S. Cl.
CPC .............. *C10M 129/70* (2013.01); *C09K 5/04* (2013.01); *C10M 129/66* (2013.01); *C10M 171/008* (2013.01); *C10M 2203/1006* (2013.01); *C10M 2203/1025* (2013.01); *C10M 2207/042* (2013.01); *C10M 2207/24* (2013.01); *C10M 2207/281* (2013.01); *C10M 2207/2825* (2013.01); *C10M 2207/2835* (2013.01); *C10M 2207/401* (2013.01); *C10M 2209/043* (2013.01); *C10M 2209/1033* (2013.01); *C10M 2209/1055* (2013.01); *C10N 2220/022* (2013.01); *C10N 2220/023* (2013.01); *C10N 2220/028* (2013.01); *C10N 2220/302* (2013.01); *C10N 2230/02* (2013.01); *C10N 2230/08* (2013.01); *C10N 2240/02* (2013.01); *C10N 2240/04* (2013.01); *C10N 2240/10* (2013.01); *C10N 2240/30* (2013.01)

(58) Field of Classification Search
CPC ........ C09K 5/04; C09K 5/045; C10M 129/70; C10M 129/66; C10M 2207/24; C10M 2207/243; C10M 2207/246; C10M 2207/281; C01M 2207/2815
USPC .............................. 252/68; 508/501
See application file for complete search history.

(56) References Cited

U.S. PATENT DOCUMENTS

| 3,723,320 A | 3/1973 | Herber et al. |
| 5,202,044 A | 4/1993 | Hagihara et al. |
| 5,395,544 A * | 3/1995 | Hagihara ............... C09K 5/045 252/68 |
| 5,494,597 A * | 2/1996 | Krevalis, Jr. .......... C09K 5/045 252/67 |
| 5,720,895 A * | 2/1998 | Nakagawa .............. C07C 43/10 252/67 |
| 2007/0032391 A1 | 2/2007 | Tagawa et al. |
| 2009/0199994 A1* | 8/2009 | Amano .................. C09K 5/063 165/10 |

FOREIGN PATENT DOCUMENTS

| CN | 1396246 | 2/2003 |
| EP | 0 537 983 | 10/1992 |
| EP | 0 612 835 | 2/1994 |
| EP | 2 039 746 | 7/2007 |
| EP | 2 243 819 | 1/2009 |
| EP | 2 471 896 | 7/2012 |
| JP | 49-99975 | 9/1974 |
| JP | 05-017792 | 1/1993 |
| JP | 05-171174 | 7/1993 |
| JP | 06-293893 | 10/1994 |
| JP | 09071796 A * | 3/1997 |
| JP | 09-189453 | 7/1997 |
| JP | 2946075 B2 * | 9/1999 |
| JP | 2000-008069 | 1/2000 |
| JP | 2000-345183 | 12/2000 |
| JP | 2003-020493 | 1/2003 |

OTHER PUBLICATIONS

International Search Report for PCT/JP2013/072593, which was mailed on Nov. 12, 2013.
International Preliminary Report on Patentability for PCT/JP2013/072593, which was mailed on Mar. 3, 2015.
Office Action issued in China Counterpart Patent Appl. No. 201380041992.6, dated Nov. 4, 2015.

* cited by examiner

*Primary Examiner* — Douglas M C Ginty
(74) *Attorney, Agent, or Firm* — Greenblum and Bernstein, P.L.C.

(57) ABSTRACT

The present invention provides a lubricating oil composition comprising a lubricating base oil, and at least one ester additive selected from a first ester that is a fatty acid 3,4-epoxycyclohexyl alkyl ester and a second ester that is a 3,4-epoxycyclohexyl carboxylic acid alkyl ester, wherein a content of the ester additive is 0.01 to 5.0% by mass based on the total mass of the lubricating oil composition.

15 Claims, No Drawings

LUBRICANT COMPOSITION

TECHNICAL FIELD

The present invention relates to a lubricating oil composition containing an ester having an epoxy structure in its molecule added to a lubricating base oil, especially to a lubricating oil composition with a greatly improved stability by adding an ester that is a fatty acid 3,4-epoxycyclohexylalkyl ester and/or a 3,4-epoxycyclohexyl carboxylic acid alkyl ester to capture acidic substances generated due to the deterioration of a lubricating oil or a mixed fluid of a lubricating oil and a refrigerant when used for a refrigerating equipment.

BACKGROUND ART

Mechanical systems such as industrial machineries, vehicles and refrigerating equipments have a variety of sliding parts such as various bearings, pistons, cylinders, gears and drive systems in which frictions are constantly repeated. If poor lubrications occur in these sliding parts, lubrication systems or mechanical systems including the same are no longer able to work as desired. Therefore, various lubricating oils are used as lubricants in the sliding parts depending on the operating environments and conditions.

High stability is required for these lubricating oils from the viewpoint of long-term reliability, but acidic substances are generated due to thermal and oxidative deterioration along with use of the lubricating oils. Since the generated acidic substances exerts a so-called autocatalytic effect, promoting further deterioration, the stability of the lubricants can be greatly increased by removing the acidic substances at an early stage.

In the field of refrigerating equipments, there are movements of transition from current hydrofluorocarbon (HFC) refrigerants having a high global warming potential (GWP) to hydrofluoroolefin (FIFO) refrigerants having a ¹/₁₀₀ or less GWP, from the viewpoint of the prevention of global warming, and a wide range of investigations such as mixed refrigerants containing HFO is underway.

However, since these HFO refrigerants have a low GWP, that is, are easily degradable, hydrofluoric acid (HF) that is a strong acid is therefore generated when degraded in the co-presence of lubricating oils in a refrigeration cycle, and promotes the further deterioration of the lubricating oils and refrigerants, or may cause corrosive wear in some cases to become the cause of system troubles. Thus, it is a major object to increase the stability of a mixed fluid of refrigerants and lubricating oils by effectively removing hydrofluoric acid and acidic substances generated due to the deterioration of lubricating oils.

Since dichlorodifluoromethane (R12) and hydrochlorodifluoromethane (R22) have been largely used as a conventional refrigerant in refrigeration and air-conditioning systems such as refrigerators, car air conditioners and room air conditioners and hydrochloric acid is generated when these refrigerants containing chlorine are mixed with lubricating oils of compressors and deteriorated after used for a long time, it is known to add phenyl glycidyl ether and alkylene oxide compounds which capture hydrochloric acid in the molecules to lubricating oils for compressors (refrigerating machine oils).

Thereafter, the stability of refrigerating machine oils has been attempted to be further improved; for example, Patent Literature 1 shows a refrigerating machine oil containing a glycidyl ether compound having two or more epoxy groups in the molecule; Patent Literature 2 proposes a lubricating oil wherein a phosphorus-based additive and a specific epoxy compound are added in combination therewith; and Patent Literature 3 proposes a refrigerating machine oil to which tricresyl phosphate and an epoxy constituted by glycidyl ether or a carbodiimide are added. Further, Patent Literature 4 shows a refrigerating machine oil containing an alicyclic polycarboxylic acid ester compound as a lubricating base oil, and additionally at least one of an epoxy compound selected from the group consisting of a glycidyl ester type epoxy compound and an alicyclic epoxy compound.

However, these stabilizing agents have a purpose of capturing hydrochloric acid or suppressing the hydrolysis of an ester that is a lubricating base oil, and their effects are insufficient for a novel HFO refrigerant generating hydrofluoric acid that is a strong acid. Moreover, since organic materials such as plastics have come to be largely used in recent devices, for reductions in size and weight and higher efficiency, a stabilizing agent exhibiting a high effect even at a small amount thereof added is desired in order to reduce influences on these organic materials.

CITATION LIST

Patent Literature

Patent Literature 1: Japanese Patent Application Laid-Open No. 5-17792
Patent Literature 2: Japanese Patent Application Laid-Open No. 5-171174
Patent Literature 3: Japanese Patent Application Laid-Open No. 9-189453
Patent Literature 4: Japanese Patent Application Laid-Open No. 2000-345183

SUMMARY OF INVENTION

Technical Problem

The present invention has been made in view of the problems of the prior arts described above, and has an object to provide a lubricating oil composition having an excellent long-term reliability, of which stability is increased by adding thereto a stabilizing agent exhibiting a sufficient effect at a small amount thereof added even in the case that a strong acid such as hydrofluoric acid is generated.

Solution to Problem

As a result of intensive investigations in order to achieve the above object, the present inventors have found that the stability of a lubricating oil can be greatly improved by adding an ester that is a fatty acid 3,4-epoxycyclohexylalkyl ester and/or a 3,4-epoxycyclohexyl carboxylic acid alkyl ester to a lubricating base oil at a specific amount thereof. Then, they have completed the present invention based on this finding.

That is, the present invention provides a lubricating oil composition as shown in the following [1] to [9].

[1] A lubricating oil composition comprising:
   a lubricating base oil; and
   at least one ester additive selected from a first ester that is a fatty acid 3,4-epoxycyclohexyl alkyl ester and a second ester that is a 3,4-epoxycyclohexyl carboxylic acid alkyl ester, wherein a content of the ester additive is 0.01 to 5.0% by mass based on the total mass of the lubricating oil composition.

[2] The lubricating oil composition as described in [1], wherein a constituent fatty acid of the first ester is a branched fatty acid having 5 to 20 carbon atoms, and an alkyl group contained in an ester group of the second ester is a branched alkyl group having 5 to 20 carbon atoms.

[3] The lubricating oil composition as described in [1] or [2], wherein the first ester has a structure containing a 1,2-epoxycyclohexane ring, a residue obtained by removing a hydrogen atom from a carboxyl group of the fatty acid, and a linear alkylene group having 1 to 4 carbon atoms, wherein the residue is bound to a carbon atom at 4- or 5-position of the 1,2-epoxycyclohexane ring via the linear alkylene group.

[4] The lubricating oil composition as described in any one of [1] to [3], wherein a kinematic viscosity at 40° C. of the lubricating oil composition is 5 to 1000 mm$^2$/s.

[5] The lubricating oil composition as described in any one of [1] to [4], wherein the lubricating base oil is at least one selected from a mineral oil-based base oil, a synthetic oil-based base oil and an animal and vegetable oil-based base oil.

[6] The lubricating oil composition as described in [5], wherein the synthetic oil-based base oil is at least one selected from an ester and an ether.

[7] A lubricating oil composition for a refrigerating machine, comprising the lubricating oil composition as described in [6].

[8] The lubricating oil composition for a refrigerating machine as described in [7], wherein the synthetic oil-based base oil is at least one selected from a polyol ester, a polyalkylene glycol and a polyvinyl ether.

[9] The lubricating oil composition for a refrigerating machine as described in [8], being used together with a refrigerant comprising an unsaturated hydrofluorocarbon.

Advantageous Effects of Invention

According to the present invention, it is possible to provide a lubricating oil composition having an excellent long-term reliability, of which stability is increased by adding thereto a stabilizing agent exhibiting a sufficient effect at a small amount thereof added even when a strong acid such as hydrofluoric acid is generated.

For example, when a lubricating oil composition of the present invention is used as a lubricating oil for general machineries and vehicles, the stability can be greatly improved by capturing acidic substances generated due to the thermal and oxidative deterioration along with use of the lubricating oil, and the lubricating oil composition of the present invention therefore exerts a special effect that the composition can be used stably for a long period of time.

Also, when a lubricating oil composition of the present invention is used as a lubricating oil for a refrigerating machine, the stability can be greatly improved by effectively capturing acidic substances including strong acids generated due to the thermal deterioration of a mixed fluid of lubricating oils and refrigerants, and the lubricating oil composition of the present invention therefore exerts a special effect that the composition can be used stably for a long period of time.

DESCRIPTION OF EMBODIMENTS

A lubricant oil composition of an embodiment of the present invention comprises a lubricating base oil and at least one ester additive selected from a first ester that is a fatty acid 3,4-epoxycyclohexyl alkyl ester and a second ester that is a 3,4-epoxycyclohexyl carboxylic acid alkyl ester, wherein a content of the ester additive is 0.01 to 5.0% by mass based on the total mass of the lubricating oil composition.

Physical properties of the lubricating oil composition are not particularly limited, but the kinematic viscosity at 40° C. of the lubricating oil composition is preferably 5 to 1000 mm$^2$/s, more preferably 5 to 300 mm$^2$/s, further preferably 5 to 220 mm$^2$/s, and most preferably 5 to 150 mm$^2$/s.

Each component of the lubricating oil composition of the present embodiment is described in detail below.

[Lubricating Base Oil]

As the lubricating base oil in the present embodiment, a lubricating base oil such as a mineral oil-based base oil, a synthetic oil-based base oil and an animal and vegetable oil-based base oil is used.

Physical properties of the lubricating base oil are not particularly limited, but the kinematic viscosity at 40° C. of the lubricating base oil is preferably 5 to 1000 mm$^2$/s, more preferably 5 to 300 mm$^2$/s, and further preferably 5 to 150 mm$^2$/s. The viscosity index of the lubricating base oil is preferably 10 or more. The pour point of the lubricant base oil is preferably −10° C. or less, and more preferably −20° C. or less. The flash point of the lubricating base oil is preferably 120° C. or more, and more preferably 200° C. or more.

Examples of the mineral oil-based base oil include a paraffin-based base oil, a naphthene-based base oil, and a mixed oil-based base oil. Any of these base oils are purified lubricating oil fractions which are obtained by treating a lubricating oil fraction prepared by an atmospheric distillation and further reduced pressure distillation of a crude oil, with appropriate combination of purification means of lubricating oils such as a solvent deasphalting, a solvent extraction, a hydro purification, a hydro degradation, a solvent dewaxing, a hydro dewaxing and a clay treatment, and may be suitably used. By combining various purification means and various raw materials, it is possible to obtain purified lubricating oil fractions of different properties. In the present embodiment, the mineral oil-based base oils may be used singly, or in combinations of two or more.

Examples of the synthetic oil-based base oil include base oil containing a compound having an oxygen atom such as esters and ethers, and a hydrocarbon-based base oil such as poly-α-olefins (PAO), ethylene-α-olefin oligomers, alkylbenzenes and alkyl naphthalenes.

Among the base oils containing a compound having an oxygen atom, the esters are commercially available as compounds of various molecular structures; each compound has individually peculiar viscosity properties and peculiar low temperature properties; and the esters are base oils characterized by having a higher flash point than that of the hydrocarbon-based base oil having the same viscosity. The esters may be obtained by the dehydration condensation reaction of fatty acids and alcohols, but, in the present invention, from the viewpoint of chemical stability, examples of suitable base oil components include a diester of a dibasic acid and a monohydric alcohol, a polyol ester of a polyol (especially neopentyl polyol) and a monovalent fatty acid, or a complex ester of a polyol, a polybasic acid and a monohydric alcohol (or a monovalent fatty acid). Among them, a polyol ester having an excellent stability is preferable. The first and second esters that are the ester additives are not included in the ester referred to herein as the lubricating base oil.

Examples of the ether include polyalkylene glycols and polyvinyl ether.

Examples of polyalkylene glycols include polypropylene glycol. For the end structures of a polyalkylene glycol, at least one end is preferably an alkyl group, and particularly preferably a methyl group from the viewpoint of suppressing hygroscopicity. Further, from the viewpoint of the manufacturability and cost, it is preferable that either one of the ends is an alkyl group, and the other is a hydrogen atom, and it is particularly preferable that either one of the ends is a methyl group, and the other is a hydrogen atom. For the main skeleton of the polyalkylene glycol, a copolymer containing an oxyethylene group (EO) and an oxypropylene group (PO) is preferable from the viewpoint of lubricity; a ratio (EO/PO+EO) of the oxyethylene group to the total of the oxyethylene group and the oxypropylene group is preferably in the range of 0.1 to 0.8, and more preferably in the range of 0.3 to 0.6. Further, from the viewpoint of hygroscopicity and thermal and chemical stability, the value of EO/(PO+EO) is preferably in the range of 0 to 0.5, more preferably in the range of 0 to 0.2, and most preferably 0 (i.e., a propylene oxide homopolymer).

Examples of the polyvinyl ether include one having a structural unit represented by a formula (1):

[Chemical Formula 1]

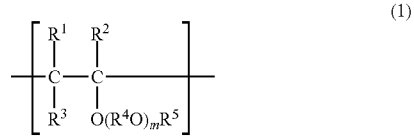

[$R^1$, $R^2$ and $R^3$ may be the same or different, and each represent a hydrogen atom or a hydrocarbon group having 1 to 8 carbon atoms; $R^4$ represents a divalent hydrocarbon group having 1 to 10 carbon atoms or a divalent ether-bonded oxygen-containing hydrocarbon group having 2 to 20 carbon atoms; $R^5$ represents a hydrocarbon group having 1 to 20 carbon atoms; m represents such a number that the average value of m for the above polyvinyl ether becomes 0 to 10; $R^1$ to $R^5$ may be the same or different in each of the structural units; and, when m is 2 or more in one structural unit, a plurality of $R^4O$ in the one structural unit may be the same or different.]

The polyvinyl ether may be a homopolymer of which structural units are the same, or a copolymer constituted by two or more of structural units, but the copolymer is preferable, because the properties can be adjusted well-balanced by being the copolymer.

Among the hydrocarbon oils, PAO is a polymer of α-olefins, and the properties of the PAO can be adjusted by selecting the type and polymerization degree of the α-olefins.

In the alkylbenzene, there are a branched type and a linear type in terms of the structure of the alkyl group, and they are different in the properties and therefore used selectively depending on the purpose. In the field of a lubricating oil for a refrigerating machine, the alkylbenzene is useful as a lubricating base oil.

Examples of the animal and vegetable oil-based base oil include milk fat, cow fat, lard (pig fat), mutton fat, neatsfoot oil, whale oil, salmon oil, bonito oil, herring oil, cod oil, rapeseed oil, palm oil, safflower oil, peanut oil, corn oil, rice bran oil, kapok oil, sesame oil, linseed oil, castor oil, cacao fat, sya fat, palm oil, palm kernel oil, coconut oil, hempseed oil, soybean oil, cotton seed oil, sunflower oil, camellia oil, rice oil, tea seed oil, and olive oil.

In the present embodiment, among a mineral oil-based base oil, a synthetic oil-based base oil, an animal and vegetable oil-based base oil, one may be used singly. Also, two or more may be appropriately combined, and mixed at appropriate ratios, so as to meet various properties required for each application. Furthermore, in each of the mineral oil-based base oil, synthetic oil-based base oil and animal and vegetable oil-based base oil, two or more of such lubricating base oils may be used in combinations.

[Ester Additives]

The lubricating oil composition of the present embodiment comprises at least one ester additive selected from the group consisting of a first ester that is a fatty acid 3,4-epoxycyclohexyl alkyl ester and a second ester that is a 3,4-epoxycyclohexyl carboxylic acid alkyl ester.

The first ester (a fatty acid 3,4-epoxycyclohexyl alkyl ester) has a structure containing the 3,4-epoxycyclohexyl-alkyl group and a residue obtained by removing a hydrogen atom from a carboxyl group (—COOH) of the fatty acid wherein the 3,4-epoxycyclohexylalkyl group is bound to the residue. The epoxy ring is constituted by two carbon atoms at 3- and 4-positions from the bound position of the residue (a carbon atom at 1-position of the fatty acid 3,4-epoxycyclohexyl alkyl ester), and one oxygen atom. In other words, the first ester has a structure containing a 1,2-epoxycyclohexane ring, a residue obtained by removing a hydrogen atom a carboxyl group of the fatty acid, and an alkylene group wherein the residue is bound to a carbon atom at 4- or 5-position of the 1,2-epoxycyclohexane ring via the alkylene group. The alkylene group is preferably a linear alkylene group having 1 to 4 carbon atoms.

Preferable examples of the first ester include a compound represented by the following formula (2):

[Chemical Formula 2]

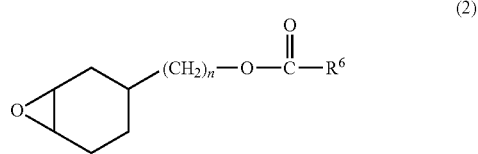

[$R^6$ represents a hydrocarbon group having 4 to 19 carbon atoms, and n represents an integer of 1 to 4.]

$R^6$ in the formula (2) is preferably an alkyl group, and more preferably a branched alkyl group. The number of the carbon atoms in the hydrocarbon group is 4 to 19, and preferably 6 to 10. As the $R^6$, 1-ethylpentyl and 2,4,4-trimethylpentyl are particularly preferable from the viewpoint of the characteristic balance as a lubricating oil.

The number of repetition n of —$(CH_2)_n$— in the formula (2) is an integer of 1 to 4, and preferably 1 or 2.

The second ester (a 3,4-epoxycyclohexyl carboxylic acid alkyl ester) has a structure containing a 1,2-epoxycyclohexane ring and an ester group wherein the ester group is directly bound to a carbon atom at 4- or 5-position of the 1,2-epoxycyclohexane ring. The epoxy ring is constituted by two carbon atoms at 3- and 4-positions from the bound position (a carbon atom at 1-position of the 3,4-epoxycyclohexyl carboxylic acid alkyl ester) of the residue, and one oxygen atom.

Preferable examples of the second ester include a compound represented by the following formula (3):

[Chemical Formula 3]

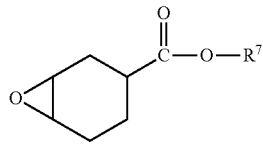

(3)

[R[7] represents an alkyl group having 5 to 20 carbon atoms.]

R[7] in the formula (3) is preferably a branched alkyl group. The number of the carbon atoms of R[7] is 5 to 20, and preferably 6 to 10. As the R[7], 2-ethylhexyl and 3,5,5-trimethylhexyl are particularly preferable from the viewpoint of the characteristic balance as a lubricating oil.

In the present embodiment, as the ester additive, one of the first and second esters may be used singly, or two or more may be used in combination. The content of the ester additive is 0.01 to 5.0% by mass, and preferably 0.1 to 2.0% by mass, based on the total mass of the lubricating oil composition. If the content is less than the above lower limit, the stability-improving effect by the addition of the ester additive is insufficient. If the content exceeds the above upper limit, influence on swelling and the like of organic materials used in devices to which the lubricating oil composition is applied is increased. Here, when using two or more of the ester additives, the content of the ester additives means the total content of those ester additives used.

[Other Additives]

The lubricating oil composition of the present embodiment may comprise other additives such as antioxidants, friction modifiers, anti-wear agents, extreme pressure agents, rust inhibitors, metal deactivators and antifoaming agents, for the purpose of further improving the performance, in the scope of not impairing the object of the present invention.

Examples of the antioxidants include phenol-based compounds such as di-tert-butyl-p-cresol, and amine-based compounds such as alkyl diphenylamines; examples of the friction modifiers include aliphatic amines, aliphatic amides, aliphatic imides, alcohols, esters, acidic phosphate amine salts, and phosphite amine salts; examples of the anti-wear agents include phosphates and zinc dialkyl dithiophosphates; examples of extreme pressure agents include sulfurized olefins and sulfurized oils and fats; examples of the rust inhibitor include alkenyl succinic acid esters or partial esters; examples of the metal deactivators include benzotriazoles; and examples of the antifoaming agents include silicone compounds and ester-based antifoaming agents.

When using the lubricating oil composition of the present embodiment as a lubricating oil for general machineries or vehicles, a mineral oil-based base oil may be preferably used as the lubricating base oil. If conventional lubricating oils using a mineral oil-based base oil as the lubricating base oil are used in these applications, acidic substances such as carboxylic acids derived from the mineral oil-based base oil are generated in a large quantity due to the thermal and oxidative deterioration of the mineral oil-based base oil. When the content of additives is increased for suppressing the generation of the acidic substances, corrosion of the device and the like become problems. In contrast, according to the lubricating oil composition of the present embodiment, the effects of the specific ester additive are high even at a small content added, and therefore the stability can be greatly improved, and the corrosion can be reduced, without affecting the other properties of the lubricating oil.

In the case of refrigerating equipment, as described herein above, there are movements of transition from current HFC refrigerant having a high GWP to a refrigerant having a low GWP such as HFO refrigerant, from the viewpoint of the prevention of global warming, and a lubricating oil suitably applied thereto is desired. The lubricating oil composition of the present embodiment is very useful also as a lubricating oil composition for a refrigerating machine used together with a low GWP refrigerant.

Describing in more detail about the refrigerant, currently, 1,1,1,2-tetrafluoroethane (HFC-134a, R134a) is widely used for refrigerators and car air-conditioners, and R410A which is a 1/1 mixed refrigerant of difluoro methane (HFC-32, R32) and pentafluoroethane (HFC-125, R125) is widely used for room air-conditioners. As the lubricating base oil of a lubricating oil for a refrigerating machine (a refrigerating machine oil) using these refrigerants, esters and polyethers, in particular, polyol esters, polyalkylene glycols and polyvinyl ethers having a moderate mutual solubility are suitable. However, use of these refrigerants is limited by so-called F-gas regulation, since their GWP is high.

As an alternative, refrigerants including a refrigerant containing hydrofluoroolefin (HFO) which is an unsaturated hydrocarbon having a low GWP have been investigated, and they are promising candidates. Examples of the unsaturated hydrocarbon contain 2,3,3,3-tetrafluoropropene (HFO-1234yf), 1,3,3,3-tetrafluoropropene (HFO-1234ze), and 1,2,3,3,3-pentafluoropropene (HFO-1225ye). Since these HFO refrigerants have an easily degraded olefin structure in the molecule, they are characterized by a low stability, whereas they have a low GWP. Therefore, when they are deteriorated in the co-presence of a lubricating oil in a refrigeration cycle, hydrofluoric acid (HF) that is a strong acid is easily generated, and causes system problems by further promoting the deterioration of the refrigerant and lubricating oil and, in some cases, by corrosive wear.

According to the lubricating oil composition of the present embodiment, such hydrofluoric acid and even also strong acidic substances generated due to the deterioration of lubricating oils can be effectively removed. In short, the high stability even in systems in which less stable refrigerants such as HFO and lubricating oils coexist can be maintained by the acidic substances being incorporated into the molecule of the above specific ester additive.

That is, examples of a preferred embodiment of the lubricating oil composition of the present embodiment include a lubricating oil composition for a refrigerating machine used together with a refrigerant containing an unsaturated hydrofluorocarbon. Examples of a more preferred embodiment include an operating fluid composition for a refrigerating machine which contains the lubricating oil composition of the present embodiment and a refrigerant containing an unsaturated hydrofluorocarbon. The "refrigerant containing an unsaturated hydrofluorocarbon" used herein includes both of a refrigerant consisting of an unsaturated hydrofluorocarbon only (HFO alone), and a mixed refrigerant of an unsaturated hydrofluorocarbon and other refrigerant components.

EXAMPLES

In the following, the present invention is more specifically described on the basis of Examples and Comparative Examples, but the present invention is not intended to be in any way limited to the following examples.

Examples 1 to 8 and Comparative Examples 1 to 6

In Examples 1 to 8 and Comparative Examples 1 to 6, each lubricating oil composition having each composition shown in Tables 1 and 2 was prepared by using each lubricating base oil and additive shown below. The content of each additive in Tables 1 and 2 is based on the total amount of each lubricating oil composition.

(A) Lubricating Base Oils
(A1) polyol ester (POE): ester of pentaerythritol and a mixed acid of 2-ethylhexanoic acid and 3,5,5-trimethylhexanoic acid at a mass ratio of 1:1 (kinematic viscosity at 40° C.: 68.0 mm²/s; viscosity index: 90; pour point: −40° C.; flash point: 260° C.)
(A2) diester (DE): dioctyl sebacate (kinematic viscosity at 40° C.: 11.6 mm²/s; viscosity index: 150; pour point: −50° C.; flash point: 220° C.)
(A3) polyalkylene glycol (PAG): polyoxypropylene wherein both of the ends were ether-blocked with methyl groups (average molecular weight: 1000; kinematic viscosity at 40° C.: 46.0 mm²/s; viscosity index: 190; pour point: −45° C.; flash point: 218° C.)
(A4) mineral oil: paraffin-based refined mineral oil (kinematic viscosity at 40° C.: 22.0 mm²/s; viscosity index: 95; pour point: −15° C.; flash point: 210° C.)
(A5) rapeseed oil: refined rapeseed oil (kinematic viscosity at 40° C.: 32.0 mm²/s; viscosity index: 200; pour point: −25° C.; flash point: 330° C.)

The kinematic viscosity, pour point and flash point were measured according to JIS K2283, JIS K2269 and JIS K2265, respectively.

(B) Ester Additives
The following were used as the additives of the Examples.
(B1) 3,5,5-trimethylhexanoic acid 3,4-epoxycyclohexylmethyl ester
(B2) isostearic acid 3,4-epoxycyclohexylmethyl ester
(B3) 3,4-epoxy-cyclohexane-1-carboxylic acid 3,5,5-trimethyhexyl ester (B1) was synthesized by the following method.
300.0 g of 3-cyclohexene-1-methanol (manufactured by Tokyo Chemical Industry Co., Ltd.), 352.6 g of 3,5,5-trimethylhexanoic acid (Kyowa Hakko Chemical Co., Ltd., trade name "isononan acid"), and 0.7 g of p-toluenesulfonic acid (manufactured Gangnam Chemical Co.) were heated to 120° C. with stirring, followed by reaction for 12 hours while gradually heating from 120° C. to 150° C. Then, the pressure was gradually reduced to 10 Torr (approximately 1330 Pa) at 150° C. over 3 hours to remove the unreacted starting materials from the reaction solution.

The resulting reaction solution was returned to room temperature, 562.4 g of ethyl acetate, 1124.9 g of distilled water, and 0.1 g of sodium hydroxide were added, and stirred for 30 minutes, followed by alkaline washing. Then, the solution was allowed to stand to separate into an organic layer and an aqueous layer, and the aqueous layer was withdrawn to be removed. To the above organic layer, 1124.9 g of distilled water was added, stirred for 30 minutes, and washed with water. Then, the solution was allowed to stand to separate into an organic layer and an aqueous layer, the aqueous layer was withdrawn to be removed, and this operation was performed two times in total. The collected organic layers were transferred to a recovery flask, and the desolvation of the above organic layers was carried out by using an evaporator under the condition of 10 Torr (approximately 1330 Pa) at 120° C., to give 511.0 g of 3,5,5-trimethylhexanoic acid 3-cyclohexenylmethyl ester.

Then, 554.8 g of a solution of 30% by weight of peracetic acid in ethyl acetate (moisture content: 0.41% by weight) were added dropwise to a mixture of 484.6 g of 3,5,5-trimethylhexanoic acid 3-cyclohexenylmethyl ester obtained in the above and 969.1 g of ethyl acetate over 2 hours under stirring at 30° C., and further stirred for 5 hours. Then, to the solution after the reaction, 2008.4 g of a distilled water was added, and stirred for 30 minutes, followed by washing with water. Then, the resultant solution was allowed to stand, separated into an organic layer and an aqueous layer, the aqueous layer was withdrawn to be removed, and this operation was performed four times in total. Then, the desolvation of the above organic layers was carried out by using an evaporator under the condition of 10 Torr (approximately 1330 Pa) at 150° C., to give 505.0 g of 3,5,5-trimethylhexanoic acid 3,4-epoxycyclohexylmethyl ester.

(B2) was synthesized in the same manner as (B1) using isostearic acid (manufactured by Tokyo Kasei Kogyo Co., Ltd.) in place of 3,5,5-trimethylhexanoic acid.

(B3) was synthesized by the following method.
285.0 g of 3-cyclohexene-1-carboxylic acid methyl ester (manufactured by Tokyo Chemical Industry Co., Ltd.), 322.6 g of 3,5,5-trimethyl hexanol (manufactured by Kyowa Hakko Chemical Co., Ltd., trade name "nonanol") and 0.03 g of tetrabutyl titanate were heated to 100° C. with stirring, followed by reaction for 15 hours while gradually heating from 100° C. to 200° C. Then, the pressure was gradually reduced to 10 Torr (approximately 1330 Pa) at 150° C. over one hour, to remove the unreacted starting materials from the reaction solution, and 482.2 g of 3-cyclohexene-1-carboxylic acid 3,5,5-trimethylhexyl ester was obtained.

Then, 554.8 g of a solution of 30% by weight of peracetic acid in ethyl acetate (moisture content: 0.41% by weight) were added dropwise to a mixture of 450.0 g of 3-cyclohexene-1-carboxylic acid 3,5,5-trimethylhexyl ester obtained in the above and 900.0 g of ethyl acetate over 2 hours under stirring at 30° C., and further stirred for 5 hours. Then, to the solution after the reaction, 1865.2 g of distilled water was added, and stirred for 30 minutes, followed by washing with water. Then, the resultant solution was allowed to stand to separate into an organic layer and an aqueous layer, the aqueous layer was withdrawn to be removed, and this operation was performed four times in total. Then, the desolvation of the above organic layers was carried out by using an evaporator under the condition of 10 Torr (approximately 1330 Pa) at 120° C., to give 450.0 g of 3,4-epoxycyclohexane-1-carboxylic acid 3,5,5-trimethylhexyl ester.

(C) Other Additives
(C1) 3,4-epoxycyclohexylmethyl (3,4-epoxy) cyclohexane carboxylate
(C2) glycidyl-2,2-dimethyl octanoate
(C3) glycidyl-tert.-butyl benzoate (Thermal Stability Test)
The lubricating oil compositions of Examples 1 to 8 and Comparative Examples 1 to 6 were used as sample oils, and thermal stability tests were carried out by the following method.

90 g of the sample oil, of which water content was adjusted to 1000 ppm, were weighed into the autoclave, catalysts (iron, copper and aluminum wires; the outer diameters of all of them: 1.6 mm×50 mm), and 10 g of HFO-1234yf refrigerant and 50 cc of air were sealed thereinto, heated to 175° C., and measured for the appearance and acid value of the sample oil after 100 hours (JIS C2101). The acid value of the sample oil (new oil) before the thermal stability test, and the appearance and acid value of the sample oil after the heat stability test are shown in Tables 1 and 2.

TABLE 1

| | Example 1 | Example 2 | Example 3 | Example 4 |
|---|---|---|---|---|
| <Lubricating base oil> | A-1 | A-1 | A-1 | A-2 |
| <Additive> (% by mass) | | | | |
| B-1 | 0.5 | — | — | 0.5 |
| B-2 | — | 0.1 | — | — |
| B-3 | — | — | 1.0 | — |
| Kinematic viscosity at 40° C. of lubricating oil composition (mm²/s) | 67.8 | 67.9 | 67.5 | 11.7 |
| New oil, Acid value (mgKOH/g) | 0.01 | 0.01 | 0.01 | 0.01 |
| After thermal stability test | | | | |
| Appearance | Precipitates: none | Precipitates: none | Precipitates: none | Precipitates: none |
| Acid value (mgKOH/g) | 0.07 | 0.10 | 0.03 | 0.08 |

| | Example 5 | Example 6 | Example 7 | Example 8 |
|---|---|---|---|---|
| <Lubricating base oil> | A-3 | A-3 | A-4 | A-5 |
| <Additive> (% by mass) | | | | |
| B-1 | — | — | 0.1 | — |
| B-2 | 0.5 | — | — | 1.0 |
| B-3 | — | 0.2 | — | — |
| Kinematic viscosity at 40° C. of lubricating oil composition (mm²/s) | 45.8 | 45.9 | 21.9 | 31.5 |
| New oil, Acid value (mgKOH/g) | 0.01 | 0.01 | 0.01 | 0.05 |
| After thermal stability test | | | | |
| Appearance | Precipitates: none | Precipitates: none | Precipitates: none | Precipitates: none |
| Acid value (mgKOH/g) | 0.03 | 0.05 | 0.02 | 0.08 |

TABLE 2

| | Comparative Example 1 | Comparative Example 2 | Comparative Example 3 |
|---|---|---|---|
| <Base oil> | A-1 | A-1 | A-2 |
| <Additive> (% by mass) | | | |
| C-1 | — | 0.5 | — |
| C-2 | — | — | 1.0 |
| C-3 | — | — | — |
| Kinematic viscosity at 40° C. of lubricating oil composition (mm²/s) | 68.0 | 67.7 | 11.6 |
| New oil, Acid value (mgKOH/g) | 0.01 | 0.01 | 0.01 |
| After thermal stability test | | | |
| Appearance | Precipitates: observed | Precipitates: observed | Precipitates: observed |
| Acid value (mgKOH/g) | 0.75 | 0.28 | 0.25 |

| | Comparative Example 4 | Comparative Example 5 | Comparative Example 6 |
|---|---|---|---|
| <Base oil> | A-3 | A-4 | A-5 |
| <Additive> (% by mass) | | | |
| C-1 | — | — | — |
| C-2 | — | 0.5 | — |
| C-3 | 0.5 | — | 1.0 |
| Kinematic viscosity at 40° C. of lubricating oil composition (mm²/s) | 45.7 | 21.8 | 31.6 |
| New oil, Acid value (mgKOH/g) | 0.01 | 0.01 | 0.05 |
| After thermal stability test | | | |
| Appearance | Precipitates: observed | Precipitates: observed | Precipitates: observed |
| Acid value (mgKOH/g) | 0.41 | 0.20 | 0.52 |

As can be seen from Tables 1 and 2, the lubricating oil compositions of Examples 1 to 8 were small in the increase of the acid value, and not observed for precipitates, even in the thermal stability test at a high temperature in the co-presence of air, water and HFO-1234yf generating hydrofluoric acid. In the case of Examples 1 to 4 using the ester base oil and Example 8 using rapeseed oil, it is shown that hydrolysis was suppressed in the co-presence of water; and in the case of Examples 5 to 7 using the lubricating base oil which does not hydrolyze, it can be said that the oxidative deterioration was suppressed, since the test was in the co-presence of air and water.

On the other hand, in all cases of the lubricating oil compositions of Comparative Examples 1 to 6, precipitates were observed, and the increase of the acid value was large. From these results, the lubricating oil composition of the present invention can achieve, in a small addition amount, the same effects as conventional additives, and can suppress the influence on the organic materials in the system. In addition, the stability is greatly improved when the addition amount is the same level as conventional additives.

INDUSTRIAL APPLICABILITY

The lubricating oil composition of the present invention can greatly improve, with the addition of a small amount of the additive, the stability by effectively capturing acidic substances generated due to thermal and oxidative deterioration along with use of lubricating oils in the case of oil pressure-operating oil and engine oils using mainly mineral oils as the lubricating base oil, or acidic substances including strong acids generated due to the thermal deterioration of mixed fluids of lubricating oils and refrigerants in the case of lubricating oils for a refrigerating machine using mainly oxygen-containing compounds as the lubricating base oil, and can be therefore suitably used for general machineries, vehicles refrigerating machines and the like.

The invention claimed is:

1. A lubricating oil composition comprising:
   a lubricating base oil; and
   at least one ester additive selected from a first ester that is a fatty acid 3,4-epoxycyclohexyl alkyl ester and a second ester that is a 3,4-epoxycyclohexyl carboxylic acid alkyl ester,
   wherein a content of the ester additive is 0.01 to 5.0% by mass based on the total mass of the lubricating oil composition.

2. The lubricating oil composition according to claim 1, wherein a constituent fatty acid of the first ester is a branched fatty acid having 5 to 20 carbon atoms, and an alkyl group contained in an ester group of the second ester is a branched alkyl group having 5 to 20 carbon atoms.

3. The lubricating oil composition according to claim 1, wherein the first ester has a structure containing a 1,2-epoxycyclohexane ring, a residue obtained by removing a hydrogen atom from a carboxyl group of the fatty acid, and a linear alkylene group having 1 to 4 carbon atoms, wherein the residue is bound to a carbon atom at 4- or 5-position of the 1,2-epoxycyclohexane ring via the linear alkylene group.

4. The lubricating oil composition according to claim 1, wherein a kinematic viscosity at 40° C. of the lubricating oil composition is 5 to 1000 mm$^2$/s.

5. The lubricating oil composition according to claim 1, wherein the lubricating base oil is at least one selected from a mineral oil-based base oil, a synthetic oil-based base oil and an animal and vegetable oil-based base oil.

6. The lubricating oil composition according to claim 5, wherein the synthetic oil-based base oil is at least one selected from an ester and an ether.

7. A lubricating oil composition for a refrigerating machine, consisting of the lubricating oil composition according to claim 6.

8. The lubricating oil composition for a refrigerating machine according to claim 7, wherein the synthetic oil-based base oil is at least one selected from a polyol ester, a polyalkylene glycol and a polyvinyl ether.

9. The lubricating oil composition for a refrigerating machine according to claim 8, being used together with a refrigerant comprising an unsaturated hydrofluorocarbon.

10. The lubricating oil composition of claim 1, wherein the at least one ester additive is the first ester.

11. The lubricating oil composition of claim 1, wherein the at least one ester additive is the second ester.

12. The lubricating oil composition of claim 1, wherein the first ester is represented by the following formula (2):

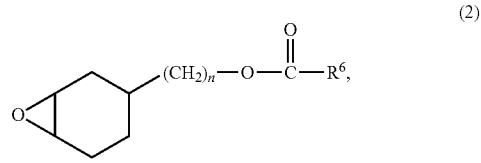

where $R^6$ represents a hydrocarbon group having 4 to 19 carbon atoms and n represents an integer of 1 to 4, and the second ester is represented by the following formula (3):

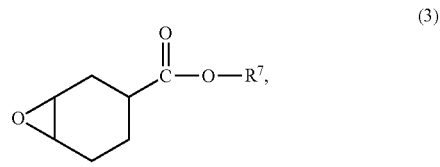

where $R^7$ represents an alkyl group having 5 to 20 carbon atoms.

13. The lubricating oil composition of claim 12, wherein the at least one ester additive is the first ester.

14. The lubricating oil composition of claim 12, wherein the at least one ester additive is the second ester.

15. The lubricating oil composition of claim 1, comprising the first and second ester.

* * * * *